United States Patent Office 3,365,532
Patented Jan. 23, 1968

3,365,532
METHOD FOR THE MANUFACTURE OF
PHOSPHORODICHLORIDOTHIOATES
Kenneth C. Kauer, Midland, Mich., assignor to The Dow
Chemical Company, Midland, Mich., a corporation of
Delaware
No Drawing. Filed Mar. 12, 1965, Ser. No. 439,454
4 Claims. (Cl. 260—974)

The present invention is directed to a method for the manufacture of O-sec-alkyl phosphorodichloridothioates.

The preparation of many complex phosphorus derivatives such as O-aryl O-alkyl phosphorochloridothioates, O-aryl O-alkyl phosphoramidothioates, and O-aryl O,O-dialkyl phosphorothioates is dependent upon the use as starting materials of O-alkyl phosphorodichloridothioates, including the O-sec-alkyl phosphorodichloridothioates. The preparation of the O-alkyl phosphorodichloridothioates by heating together substantially equimolecular proportions of thiophosphoryl chloride and an alkanol has been known for many years. The reaction is as follows:

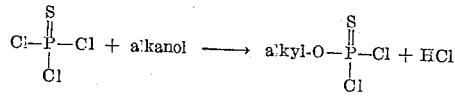

However, the reaction as heretofore conducted results in low yields of the desired O-alkyl phosphorodichloridothioates.

The methods known for the preparation of O-alkyl phosphorodichloridothioates are especially unsatisfactory when employed for the preparation of O-sec-alkyl phosphorodichloridothioates, including the two O-sec-alkyl phosphorodichloridates which are of most importance: O-isopropyl phosphorodichloridothioate and O-sec-butyl phosphorodichloridothioate. This is due to the fact that in addition to the reaction as defined by the reaction equation set forth hereinabove, the alkanol and thiophosphoryl chloride undergo a competing reaction, which, at least initially, is as follows:

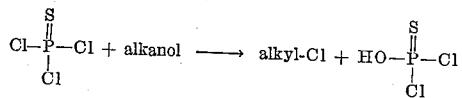

Where the alkanol is a primary alkanol, this reaction proceeds to only a limited extent. However, in the instance of a secondary alcohol, the —OH group is activated, and this reaction proceeds much more rapidly than the competing reaction as defined by the reaction equation set forth in the paragraph above. Accordingly, where the alkanol is a secondary alkanol, the yields of the desired O-sec-alkyl phosphorodichloridothioate product are very low.

The present invention constitutes an improved method for the manufacture of O-sec-alkyl phosphorodichloridothioate. It is an object of the present invention to provide a method which is economical and gives excellent yields of the O-sec-alkyl phosphorodichloridothioate. A further object of the present invention is the provision of a method which gives the O-sec-alkyl phosphorodichloridothioate in a high degree of purity. Another object of the present invention is the provision of a method which depresses the preparation of byproducts, particularly, O,O-di-sec-alkyl phosphorodichloridothioate. An additional object of the present invention is the provision of a method which can be employed for the continuous manufacture of O-sec-alkyl phosphorodichloridothioate. Other objects will become apparent from the following specification and claims.

The present method comprises (1) adding portionwise essentially one molecular proportion of pyridine to a fluid mixture (a) which is at a temperature of from 15° to 45° C. and (b) which comprises (1) at least essentially one molecular proportion of thiophosphoryl chloride and (2) essentially one molecular proportion of a secondary alkanol of the formula: R—OH wherein R represents a secondary alkyl radical being of from 3 to 4, both inclusive, carbon atoms, thereby forming a reaction mixture; and (2) maintaining said reaction mixture during the adding of the said pyridine at a temperature of from 15° to 45° C.

In the present specification and claims, the term thiophosphoryl chloride is employed in its customary sense to designate the compound of the formula

The secondary alkanol reactant (ROH) to be employed in accordance with the present invention is isopropanol or 2-butanol.

Under the conditions defined by the method of the present invention, the thiophosphoryl chloride and the secondary alkanol react to yield the desired O-sec-alkyl phosphorodichloridothioate product in good yield. Hydrogen chloride is produced as byproduct, and the pyridine employed in the practice of the present invention serves as an acceptor for the hydrogen chloride, appearing in the reaction mixture as pyridine hydrochloride. Pyridine is not generally employed in this capacity in the synthesis of organo-phosphorus compounds because it, as other tertiary bases, dealkylates the desired products. For example, it is known that pyridine dealkylates O-methyl phosphorodichloridothioate to yield the corresponding N-methylpyridinium chloride. However, under the conditions of the method of the present invention, pyridine is singularly useful as hydrogen chloride acceptor, and does not dealkylate the desired O-sec-alkyl phosphorodichloridothioate product.

In addition, it is critical to the practice of the present invention that the pyridine be added to a fluid mixture of thiophosphoryl chloride and secondary alkanol. With this order of addition, the pyridine hydrochloride forms in the reaction mixtures as small hard crystals, the presence of which does not adversely affect the fluidity and mixing of the reaction mixture. When other orders of additions are employed, the pyridine hydrochloride exists as large crystals, and yields of products are considerably lower.

It is necessary to the practice of the present invention that the mixture to which the pyridine is added be fluid. The necessary degree of fluidity can be achieved by the employment of an inert liquid reaction medium, preferably an organic liquid, such as, for example, a chlorinated hydrocarbon. Representative liquids include chloroform and methylene dichloride. In this use of an inert liquid reaction medium, the liquid employed is mixed with the thiophosphoryl chloride and the secondary alkanol to form the fluid mixture to which the pyridine is added. The precise amount of inert liquid reaction medium employed is not critical. Generally, a suitable degree of fluidity is achieved when employing the liquid medium in a volume approximately the same as that of the thiophosphoryl chloride reactant. A larger amount of liquid medium can be employed; also, a somewhat lesser amount can be used, so long as the resulting mixture is fluid enough to permit of adequate mixing as the pyridine is added. The fluidity of the mixture can also be achieved by employing an excess quantity of the thiophosphoryl chloride.

The advantages of the present process are obtained only when employing one molecular proportion of pyridine, one molecular proportion of secondary alkanol, and at least one molecular proportion of thiophosphoryl chloride. When employing an inert liquid reaction medium to obtain the fluid mixture to which the pyridine is added, equimolecular proportions of thiophosphoryl chloride, secondary alkanol, and pyridine are preferably employed. When employing an excess of the thiophosphoryl chloride to obtain the desired fluidity of the mixture to which the pyridine is added, at least 1.1 molecular proportions of thiophosphoryl chloride are used. A large excess, such as 10 molecular proportions, can be used. However, no special advantage obtains from the use of such an excess. Therefore, when excess thiophosphoryl chloride is employed to obtain fluidity, it is preferable to employ a total of about 1.5 to 3 molecular proportions of thiophosphoryl chloride, one molecular proportion of secondary alkanol, and one molecular proportion of pyridine.

The use of either an inert liquid reaction medium or excess thiophosphoryl chloride necessitates a subsequent removal operation to separate the desired O-sec-alkyl phosphorodichloridothioate product from the reaction mixture. However, the removal of excess thiophosphoryl chloride is more readily carried out than the removal of inert liquid reaction medium, and the use of excess thiophosphoryl chloride eliminates the need for an additional material (inert liquid reaction medium). In addition, the presence of excess thiophosphoryl chloride reduces even further the formation of O,O-di-sec-alkyl phosphorodichloridothioate by-product.

Accordingly, a preferred embodiment of the present invention comprises (1) adding portionwise essentially one molecular proportion of pyridine to a fluid mixture (*a*) which is at a temperature of from 15° to 45° C. and (*b*) which consists essentially of (1) from 1.5 to 3 molecular proportions of thiophosphoryl chloride and (2) one molecular proportion of a secondary alkanol of the formula R—OH wherein R represents a secondary alkyl radical being of from 3 to 4, both inclusive, carbon atoms, thereby forming a reaction mixture; and (2) maintaining said reaction mixture during the adding of the said pyridine at a temperature of from 15° to 45° C.

The reaction of thiophosphoryl chloride and alkanol is known to be somewhat exothermic and to go forward at temperatures at which hydrogen chloride is evolved. However, under the conditions of the method of the present invention, the reaction goes forward at temperatures below about 15° C. so slowly as to constitute an impractical method for manufacture of the desired O-sec-alkyl phosphorodichloridothioate. Similarly, temperatures higher than about 45° C. adversely affect the course of the present reaction to prepare O-sec-alkyl phosphorodichloridothioate, and should not be employed.

The rate at which the reaction takes place varies with the temperature employed, the rate of the portionwise addition of the pyridine to the mixture of thiophosphoryl chloride and secondary alkanol, the molecular proportion represented by the amounts of the reactants employed, and the particular secondary alkanol employed.

In carrying out the reaction, the pyridine is added portionwise over a period of time to the mixture containing the thiophosphoryl chloride and the secondary alkanol, or the thiophosphoryl chloride, secondary alkanol, and inert liquid reaction medium. It is preferred that the addition of the pyridine is carried out with mixing of the resulting reaction mixture. Such mixing insures that any yield of by-product O,O-di-sec-alkyl phosphorodichloridothioate is kept so low as to be negligible. The mixing can be accomplished by any of the many known methods; conveniently, the mixing is carried out by mechanical stirring means. After the completion of the addition of pyridine, the reaction mixture can be permitted to stand for a period of time to insure completion of the reaction.

After the completion of the reaction, or when the reaction has been carried as far as desired, the reaction mixture is washed with water to remove the pyridine hydrochloride byproduct. The washing is carried out in the reaction temperature range, preferably with a volume of water equal to the volume of the reaction mixture. The O-sec-alkyl phosphorodichloridothioate product is soluble in the washed reaction mixture, which comprises, in addition to the product, either inert liquid reaction medium or thiophosphoryl chloride depending upon which was employed to obtain the fluidity of the mixture to which the pyridine was added. Therefore, the washed reaction mixture is distilled to separate the O-sec-alkyl phosphorodichloridothioate product.

When excess thiophosphoryl chloride is employed in the reaction and separated from the washed product residue in the course of the distillation, such recovered thiophosphoryl chloride can be employed in a subsequent reaction in accordance with the present invention, that is recycled. The use of the recycled thiophosphoryl chloride is preferred because it results in the preparation of the desired product in even higher yield.

The method of the present invention can be carried out as a continuous process. In such a process, the secondary alkanol and thiophosphoryl chloride reactants are introduced or metered together into a reaction zone as a fluid mixture. The mixture is made fluid, as set forth above, by the employment either of inert liquid reaction medium or by the use of excess thiophosphoryl chloride. The fluid mixture is held at temperatures of from 15° to 45° C.; thereafter, the pyridine is introduced or metered into the reaction zone. During the introduction or metering in of the pyridine, the reaction mixture is maintained at temperatures of from 15° to 45° C. The reactants and the pyridine are employed in the ratio of 1 molecular proportion of secondary alkanol, 1 molecular proportion of pyridine, and at least one molecular proportion of thiophosphoryl chloride. During the course of the reaction, product-containing portions of the reaction mixture are withdrawn and processed as taught hereinabove to separate the desired O-sec-alkyl phosphorodichloridothioate product.

It has been found that if the removal of pyridine hydrochloride byproduct is not carried out with thoroughness, side reactions involving the O-sec-alkyl phosphorodichloridothioate product and pyridine hydrochloride byproduct occur during subsequent distillation of the washed reaction mixture. These side reactions result in the lowering of the yield of product, as well as in the release of strong mercaptan odor. Furthermore, the O-sec-alkyl phosphorodichloridothioate product reacts slowly with water, similarly lowering the yield of product. Therefore, it is preferred to conduct the washing procedure with promptness and thoroughness. Washing times of several minutes, such as 5 minutes, are usually sufficient when adequate means are provided for mixing the reaction mixture with the water.

The following examples are illustrative of the best manner now known for practicing the present invention and will enable those skilled in the art to practice the present invention.

*EXAMPLE 1.—Preparation of O-isopropyl phosphorodichloridothioate*

Thiophosphoryl chloride (6770 grams; 40 moles) is placed in a flask and 1200 grams of isopropyl alcohol (20 moles) added portionwise over a period of 10 minutes. The addition is carried out with stirring and the resulting fluid mixture held at a temperature of 20–30° C. Thereafter, 1580 grams of pyridine (20 moles) are added portionwise over a period of 2 hours to the fluid mixture to obtain a reaction mixture. The addition is carried out at temperatures of about 20–30° C. and with stirring. After the completion of the addition, the reaction mixture is held with stirring for a period of 30 minutes at a temperature of 20–30° C.

Thereafter, the reaction mixture is washed by pouring it, with stirring, into 8 liters of ice and water at a temperature of about 0° C., permitting the washed mixture to separate into water and product-containing organic layers, and separating the organic layer. The organic layer is distilled. The product, O-isopropyl phosphorodichloridothioate, boils at 59–60° C. at 10 millimeters.

In a representative preparation in accordance with this procedure, the O - isopropyl phosphorodichloridothioate product was obtained in a 76 percent yield. The product was analyzed by infrared spectroscopy and found to be of 95 percent purity.

EXAMPLES 2–5.—Preparation of O-isopropyl Phosphorodichloridothioate

Recycled thiophosphoryl chloride (6770 grams; 40 moles) is placed in a flask and 1200 grams of isopropyl alcohol (20 moles) added portionwise over a period of 10 minutes. The addition is carried out with stirring and the resulting fluid mixture held at a temperature of 25–30° C. Thereafter, 1580 grams opfyridine (20 moles) are added portionwise over a period of 2 hours to the fluid mixture to obtain a reaction mixture. The addition is carried out at temperatures of about 23–29° C. and with stirring. After the completion of the addition, the reaction mixture is held for a period of 30 minutes at a temperature of 25–30° C.

Thereafter, the reaction mixture is washed by pouring it, with stirring, into 8 liters of ice and water at a temperature of about 0° C., permitting the washed mixture to separate into water and product-containing organic layers, and separating the organic layer. The organic layer is distilled. The product, O-isopropyl phosphorodichloridothioate, boils at 59–60° C. at 10 millimeters.

In four preparations of O-isopropyl phosphorodichloridothioate in accordance with these procedures, high yields were uniformly obtained. In each preparation, the product was analyzed by infrared spectroscopy to determine the composition of the product. The results are set forth below:

|  | Run No. 1, Percent | Run No. 2, Percent | Run No. 3, Percent | Run No. 4, Percent |
|---|---|---|---|---|
| Yield of O-isopropyl phosphorodichloridothioate | 97 | 99 | 102.5 | 97 |
| Composition of product: |  |  |  |  |
| O-isopropyl phosphorodichloridothioate | 94 | 95 | 95 | 86 |
| O,O-diisopropyl phosphorochloridothioate | 6 | 5 | 5 | 5–10 |
| S-isopropyl phosphorodichloridothioate | (¹) | (¹) | (¹) | (²) |

¹ Trace.
² Remainder.

EXAMPLE 6.—Preparation of O-sec-butyl phosphorodichloridothioate

Similar results are obtained when employing thiophosphoryl chloride and 2-butanol, in the procedures of Examples 2–5, to prepare O-sec-butyl phosphorodichloridothioate.

The product boils at 64° C. under 10 millimeters pressure.

EXAMPLE 7—Preparation of O-isopropyl phosphorodichloridothioate

Thiophosphoryl chloride (3385 grams; 20 moles) is placed in a flask and thereafter 1200 grams of isopropyl alcohol (20 moles) and 2 liters of chloroform are added portionwise over a period of 10 minutes. The addition is carried out with stirring and the resulting fluid mixture held at a temperature of 25–30° C. Thereafter, 1580 grams of pyridine (20 moles) are added portionwise over a period of 2 hours to the fluid mixture to obtain a reaction mixture. The addition is carried out at temperatures of about 25–30° C. and with stirring. After the completion of the addition, the reaction mixture is held for a period of 30 minutes at a temperature of 25–30° C.

Thereafter, the reaction mixture is washed by pouring it, with stirring, into 8 liters of ice and water at a temperature of about 0° C., permitting the washed mixture to separate into water and product-containing organic layers and separating the organic layer. The organic layer is distilled. The product is obtained in yields of essentially the same order of magnitude as those of Examples 2–5.

I claim:

1. A method which comprises adding portionwise essentially one molecular proportion of pyridine to a fluid mixture which mixture comprises at least essentially one molecular proportion of thiophosphoryl chloride and essentially one molecular proportion of a secondary alkanol of the formula: R—OH wherein R represents a secondary alkyl radical being of from 3 to 4, both inclusive, carbon atoms, thereby forming a reaction mixture; and maintaining said reaction mixture during the adding of the said pyridine at a temperature of from 15° to 45° C., to produce O-sec-alkyl phosphorodichloridothioates.

2. Method of claim 1 wherein the secondary alkanol is isopropyl alcohol.

3. A method which comprises adding portionwise essentially one molecular proportion of pyridine to a fluid mixture which mixture consists essentially of from 1.5 to 3 molecular proportions of thiophosphoryl chloride and one molecular proportion of a secondary alkanol of the formula: R—OH wherein R represents a secondary alkyl radical being of from 3 to 4, both inclusive, carbon atoms, thereby forming a reaction mixture; and maintaining said reaction mixture during the adding of the said pyridine at a temperature of from 15° to 45° C., to produce O-sec-alkyl phosphorodichloridothioates.

4. The method of claim 3 wherein the secondary alkanol is isopropyl alcohol.

References Cited
UNITED STATES PATENTS
2,750,399  6/1956  Gamrath _____ 260—974

CHARLES B. PARKER, *Primary Examiner.*

A. H. SUTTO, *Assistant Examiner.*